United States Patent

Fukushima et al.

[11] Patent Number: 6,038,678
[45] Date of Patent: Mar. 14, 2000

[54] PATH SWITCHING METHOD, PATH SWITCHING APPARATUS AND NODES OF UPSR

[75] Inventors: Takao Fukushima, Fujisawa; Yoshihiro Ashi, Yokohama; Atsushi Kubotera, Fujisawa, all of Japan

[73] Assignee: Hitachi, Ltd., Tokyo, Japan

[21] Appl. No.: 08/929,650

[22] Filed: Sep. 15, 1997

[30] Foreign Application Priority Data

Sep. 20, 1996 [JP] Japan .................................. 8-250486

[51] Int. Cl.[7] .............................. G06F 13/00; G06F 11/00; H04J 3/14

[52] U.S. Cl. .................................. 714/4; 714/3; 705/410; 705/408; 370/244; 370/250

[58] Field of Search ........................ 395/182.02; 705/401, 705/403, 408, 410; 714/4, 3, 2; 370/244, 250

[56] References Cited

U.S. PATENT DOCUMENTS

| | | | |
|---|---|---|---|
| 5,390,164 | 2/1995 | Kremer | 370/16.1 |
| 5,412,652 | 5/1995 | Lu | 370/85.12 |
| 5,475,676 | 12/1995 | Takatori et al. | 370/16.1 |
| 5,537,393 | 7/1996 | Shioda et al. | 370/16.1 |
| 5,561,766 | 10/1996 | Kitamori | 395/183.19 |
| 5,600,631 | 2/1997 | Takatori et al. | 370/217 |
| 5,623,482 | 4/1997 | Okanone | 370/224 |
| 5,721,727 | 2/1998 | Ashi et al. | 370/224 |
| 5,745,476 | 4/1998 | Chandhari | 370/222 |
| 5,793,745 | 8/1998 | Manchester | 370/224 |
| 5,815,489 | 8/1998 | Takatori et al. | 370/217 |
| 5,838,924 | 11/1998 | Anderson et al. | 395/200.69 |
| 5,844,889 | 12/1998 | Takatsu et al. | 370/223 |

OTHER PUBLICATIONS

Morgan, J.A., "The survivable network's next question", Sep. 1995, Comm. Engr. & Design, vol. 21, No. 10, pp. 64,66,68,70.

Drake, J.V., "A Review of the four major SONET/SDH Rings", IEEE, Comm. Society, IEEE Conf on Comm 1993, pp. 878–884, May 23–26 1993.

Wilson, M.R., "Quantitative Impact of Survivable Network Architectures on Service Availability", IEEE Comms. 1998, pp. 122–126.

"UPSR Structure", SONET UPSR Equipment Generic Criteria, Issue 1, Mar. 1994, Revision 1, Oct. 1995.

*Primary Examiner*—Norman Michael Wright
*Attorney, Agent, or Firm*—Kenyon & Kenyon

[57] ABSTRACT

An alarm detect unit (a path switching apparatus) for selecting an active path comprises a path-alarm detect circuit and a guard timer for a working path as well as a path-alarm detect circuit and a guard timer for a protection path. When an alarm is detected on the active path, alarm information, that is, information on the generation of the alarm, is delayed by a predetermined time by the guard timer of the working or protection path that serves as the active path.

By the same token, when an alarm is detected on a standby path, alarm information, that is, information on the recovery of the alarm, is delayed by a predetermined time by the guard timer of the working or protection path that serves as the standby path. Either the working or protection path is then selected as the active path in accordance with pieces of alarm information output by the two guard timers which indicate the line-failure-occurrence states of the active and standby paths.

5 Claims, 11 Drawing Sheets

FIG. 7

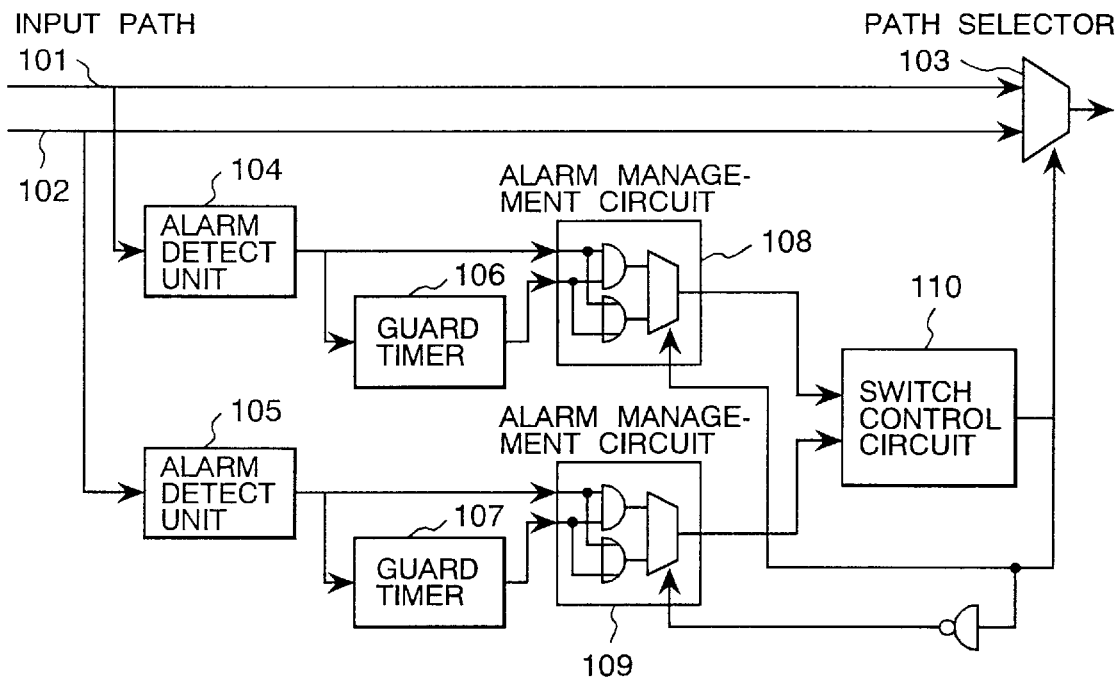

FIG. 8

SWITCHING LOGIC BY SWITCH CONTROL CIRCUIT 110

| SWITCH-ING CASES | COMBINATION OF OUTPUT LEVELS OF ALARM MANAGEMENT CIRCUITS 108 AND 109 | | ACTIVE PATH | |
|---|---|---|---|---|
| | ALARM MANAGEMENT CIRCUIT 108 | ALARM MANAGEMENT CIRCUIT 109 | INPUT PATH 101 BEING ACTIVE | INPUT PATH 102 BEING ACTIVE |
| A | L (NON-ALARM) | L (NON-ALARM) | KEEP INPUT PATH 101 ACTIVE | KEEP INPUT PATH 102 ACTIVE |
| B | H (ALARM) | L (NON-ALARM) | MAKE INPUT PATH 102 ACTIVE | KEEP INPUT PATH 102 ACTIVE |
| C | L (NON-ALARM) | H (ALARM) | KEEP INPUT PATH 101 ACTIVE | MAKE INPUT PATH 101 ACTIVE |
| D | H (ALARM) | H (ALARM) | KEEP INPUT PATH 101 ACTIVE | KEEP INPUT PATH 102 ACTIVE |

PATH SWITCHING METHOD, PATH SWITCHING APPARATUS AND NODES OF UPSR

BACKGROUND OF THE INVENTION

1. Field of the Invention

In general, the present invention relates to a compound ring network typically comprising two networks such as a UPSR (Uni-directional Protection Switch Ring) and a BLSR (Bi-directional Line Switch Ring) connected to each other. In particular, the present invention relates to a path switching method and a path switching apparatus having a function for switching from a working path to a protection path starting from two adjacent input nodes (and ending at a common path terminating node) as a normal line (an active path) by using a path switch in such a compound ring network.

2. Description of the Related Art

First of all, as conventional technologies, the BLSR and the UPSR are explained. As described in Bellcore's GENERIC REQUIREMENTS GR-1230-CORE, Issue 1, the BLSR is a ring network for connecting a plurality of nodes to each other by using transmission lines to form a ring-like shape wherein each two nodes thereof are connected by one path and, in the event of a failure occurring in a transmission line accommodating the path, a path route is changed to heal the path.

FIGS. 1 and 2 are diagrams showing configurations of path routes in a normal operation and in the event of a failure respectively in an example of a two-fiber BLSR. In particular, FIG. 1 is a diagram showing five nodes, Node-A to Node-E denoted by reference numerals 801 to 805 respectively, connected by transmission lines 806 and 807 wherein a path 808 is established between the node 801 and the node 803. In this state, assume that a failure 809 occurs on the transmission line 806 between the nodes 802 and 803 as shown in FIG. 2, causing the following switching to be carried out to heal the failing path. To be more specific, the failure 809 occurs on the transmission line 806 between the nodes 802 and 803 as shown in FIG. 2. In the event of such a failure, all paths are returned at the node 802, a node located immediately before the failure 809 occurring on the transmission line 806, establishing new path routes till the path terminating node 803 (Node-C) of the returned path through the transmission line 807. To be more specific, the path 808 shown in FIG. 2 is returned at the node 802, being continued by a newly established path 810 that ends at the node 803. In this way, the path is switched at the node 802 from the transmission line 806 to the transmission line 807, healing the original failing path 808.

As described in Chapter 3 of Bellcore's GENERIC REQUIREMENTS GR-1400-CORE, Issue 1, on the other hand, the UPSR is a network for connecting a plurality of nodes by using transmission lines to form a ring wherein each two nodes thereof are connected by two paths: a working path and a protection path.

FIG. 3 is a diagram showing the configuration of an example of the UPSR. In this example, the counterclockwise and the clockwise paths are working and protection paths respectively. To begin with, signal transmission from a node 701 to a node 703 is explained. Normally, both a working path 709 and a protection path 710 are established. At the node 703 at the end of the established paths, path-alarm detect units 711 and 712 are provided for the working and protection paths 709 and 710 respectively. In addition, the node 703 is also provided with a path select unit 713. At the present time, the path select unit 713 selects the working path 709.

Assume that a failure occurs on the working path 709 between the nodes 701 and 702 shown in FIG. 3. In this case, the failure is detected by the path-alarm detect unit 711 at the node 703. Detecting the failure, the path-alarm detect unit 711 controls the path select unit 713 to select the protection path 710 in order to recover the path from the failure.

A concrete path switching method for inter-ring connection configurations is disclosed in U.S. Pat. No. 5,390,164 with a title "Ring Interworking between Bi-directional Line-Switching Ring Transmission Systems." This document describes a switching method for maintaining communication connectivity of transmission systems in the event of a failure in a configuration comprising ring networks connected to each other by two ring nodes wherein two paths, working and protection paths, are established. Particularly, in a SONET (Synchronous Optical Network) signal, low-speed signals each known as a VT signal are multiplexed and, in addition, a multiplex frame structure for forming a high-order STS-1 signal is adopted. Thus, even if failures occur at the low-order VT-signal level, in the multiplexing process to form an STS-1 signal, pieces of information on the failures appear to be normal in controlling a switching operation. The switching method disclosed in the above reference is a switching method for reducing the probability of selecting such an abnormal low-level signal, being aimed at a case in which failures occur on the working and protection paths independently to the bitter end. Thus, the scope of the method does not include a case in which one failure affects both the working and protection lines at the same time in the inter-ring connection configuration.

A network system in which the UPSR and the BLSR described above are connected to each other is taken into consideration. According to Bellcore's GENERIC REQUIREMENTS GR-1230-CORE, in the event of path switching taking place in the BLSR due to a transmission-line failure, a time of 50 ms between the occurrence of the failure and the recovery of the line achieved through the path switching is allowed.

As shown in FIG. 3, transmission lines of a UPSR form a ring-like shape. To put it in detail, two paths in a UPSR, the working and protection paths, are set to form a circle starting from two adjacent interconnection nodes connected to a BLSR to a path terminating node as shown in FIG. 4. A difference in transmission route between the working and protection paths makes the number of nodes included in the working path different from the number of nodes included in the protection path. Thus, there is a difference in arrival time of alarm information at the path terminating node between a failure occurring on the working path and a failure occurring on the protection path. This difference in arrival time of alarm information at the path terminating node is attributed to the difference in path length caused by the difference in code count between the working and protection paths. As a result, even if a path failure with a maximum recovery time limit of 50 ms described above passes through the interconnection node at the same time, it may arrive at the path terminating node at different times.

Path switching is carried out to always select either the working and protection paths as a normal (active) path. Thus, in a case with a small difference in arrival time of failure alarm information described above, there are observed erroneous switching operations in which a selector once selects a path with a longer propagation time which appears to be the normal path before switching back later on to the path with a shorter propagation time. Particularly, in the case of a SONET signal, since low-speed paths each known as a VT signal are multiplexed and a multiplex frame structure for forming a high-order STS-1 signal is further adopted, it is quite within the bounds of possibility that erroneous switching operations described above are inadvertently carried out simultaneously on a plurality of low-speed paths.

Normally, in a transmission apparatus for handling a SONET signal, software is used for monitoring the switching state of a path. When a plurality of path erroneous switching operations described above occur at the same time, two switching operations, 'switch-over' and then 'switch-back', are carried out on each path. In this case, the monitoring software must perform very complex software processing in order to monitor the switching state of each path. Assume that erroneous switching operations occur in all VT-1.5 signals accommodated in an STS-3 signal. In this case, 168 (=84×2) wasteful switching-state monitoring operations must be carried out in a short period of time.

SUMMARY OF THE INVENTION

It is thus an object of the present invention to provide a path switching apparatus and a path switching method that are capable of preventing an erroneous switching operation from being carried out in the event of simultaneous failures occurring on the working and protection paths at the same time mostly in the course of path switching in a BLSR of a compound ring network system including a UPSR such as a network comprising a BLSR and a UPSR connected to each other.

In order to achieve the object described above, the present invention provides an alarm detect unit (a path switching apparatus) for selecting an active path comprising a path-alarm detect circuit and a guard timer for a working path as well as a path-alarm detect circuit and a guard timer for a protection path wherein, when an alarm is detected on the active path, alarm information, that is, information on the generation of the alarm, is delayed by a predetermined time by the guard timer of the working or protection path that serves as the active path whereas, when an alarm is detected on a standby path, alarm information, that is, information on the recovery of the alarm, is delayed by a predetermined time by the guard timer of the working or protection path that serves as the standby path and, finally, either the working or protection path is then selected as the active path in accordance with pieces of alarm information output by the two guard timers which indicate the line-failure-occurrence states of the active and standby paths.

In order to solve the problems described above, the present invention provides the following means.

According to one aspect of the present invention, there is provided a method for switching from a working path to a protection path or vice versa in a UPSR of a compound network connecting the UPSR to another ring network through interconnection nodes wherein:

a path is set from the other ring network to a path terminating node in the UPSR;

the working path and the protection path starting from the interconnection nodes and ending at the path terminating node form a circle; and either the working path or the protection path is selected as an active path, the method comprising the steps of:

detecting a failure occurring on the working path and a failure occurring on the protection path independently of each other as failure information;

detecting a failure information of an active path;

detecting a failure information of a standby path; and selecting either the working or protection path as the active path.

According to another aspect of the present invention, there is provided a method for switching from a working path to a protection path or vice versa in a UPSR of a compound network connecting the UPSR to another ring network through an interconnection node wherein:

a path is set from the other ring network to a path terminating node in the UPSR;

the working path and the protection path starting from the interconnection nodes and ending at the path terminating node form a circle; and either the working path or the protection path is selected as an active path, the method comprising the steps of:

detecting a failure occurring on the working path and a failure occurring on the protection path independently of each other as failure information;

detecting a failure information of an active path;

detecting a failure information of a standby path;

delaying failure detection time for the failure information of the active path by a first predetermined time;

delaying failure recovery time for the failure information of the standby path by a second predetermined time; and selecting either the working or protection path as the active path by comparing the failure information of the active path delayed by a first predetermined time with the failure information of the standby path delayed by the second predetermined time.

According to still another aspect of the present invention, there is provided a path switching apparatus for switching from a working path to a protection path or vice versa in a UPSR of a compound network connecting the UPSR to another ring network through an interconnection node wherein:

a path is set from the other ring network to a path terminating node in the UPSR;

the working path and the protection path starting from the interconnection nodes and ending at the path terminating node form a circle; and either the working path or the protection path is selected as an active path, the apparatus comprising:

nodes in the UPSR;

a failure-information detect circuit for detecting a failure occurring on the working path and a failure occurring on the protection path independently of each other as failure information;

a failure-information-path identifying circuit for determining whether a working path with a failure occurring thereon is an active or standby path or for determining whether a protection path with a failure occurring thereon is an active or standby path; and a select circuit for selecting either the working or protection path as the active path in accordance with results of detection and determination by the failure-information detect circuit and the failure-information-path identifying circuit respectively.

According to a still further aspect of the present invention, there is provided a path switching apparatus for switching from a working path to a protection path or vice versa in a UPSR of a compound network connecting the UPSR to another ring network through an interconnection node wherein:

a path is set from the other ring network to a path terminating node in the UPSR;

the working path and the protection path starting from the interconnection nodes and ending at the path terminating node form a circle; and either the working path or the protection path is selected as an active path, the apparatus comprising:
nodes in the UPSR;
a first failure-information detect circuit for detecting a failure occurring on the working path;
a second failure-information detect circuit for detecting a failure occurring on the protection path;
a first guard circuit for delaying failure detection time for failure information of the working or protection path selected as an active path by a first predetermined time;
a second guard circuit for delaying failure recovery time for failure information of the working or protection path selected as a standby path by a second predetermined time; and
a select circuit for selecting either the working or protection path as the active path in accordance with delayed failure information output by the first guard circuit and delayed failure information output by the second guard circuit.

It is advantageous to implement the methods and apparatuses for solving the problems described above by software.

In addition, the transmission system used in the networks described above can be one conforming to the SONET prescribed by ANSI and the SDH (Synchronous Digital Hierarchy) prescribed in the ITU-T recommendations.

A signal transmitted through each path can be one conforming to the VT (Virtual Tributary) prescribed by ANSI and the TU (Tributary Unit) prescribed in the ITU-T recommendations.

As an alternative, a signal transmitted through each path can be one conforming to the STS (Synchronous Transport Signal) prescribed by ANSI and the AU (Administrative Unit) prescribed in the ITU-T recommendations.

BRIEF DESCRIPTION OF THE DRAWINGS

Preferred embodiments of the present invention will now be described in conjunction with the following drawings in which:

FIG. 7 is a block configuration diagram showing a path switching apparatus (employed in each UPSR node) as provided by the present invention;

FIG. 8 is a table showing switching logic embraced by a switch control circuit employed in the path switching apparatus shown in FIG. 7;

DESCRIPTION OF THE PREFERRED EMBODIMENTS

Figure 1:
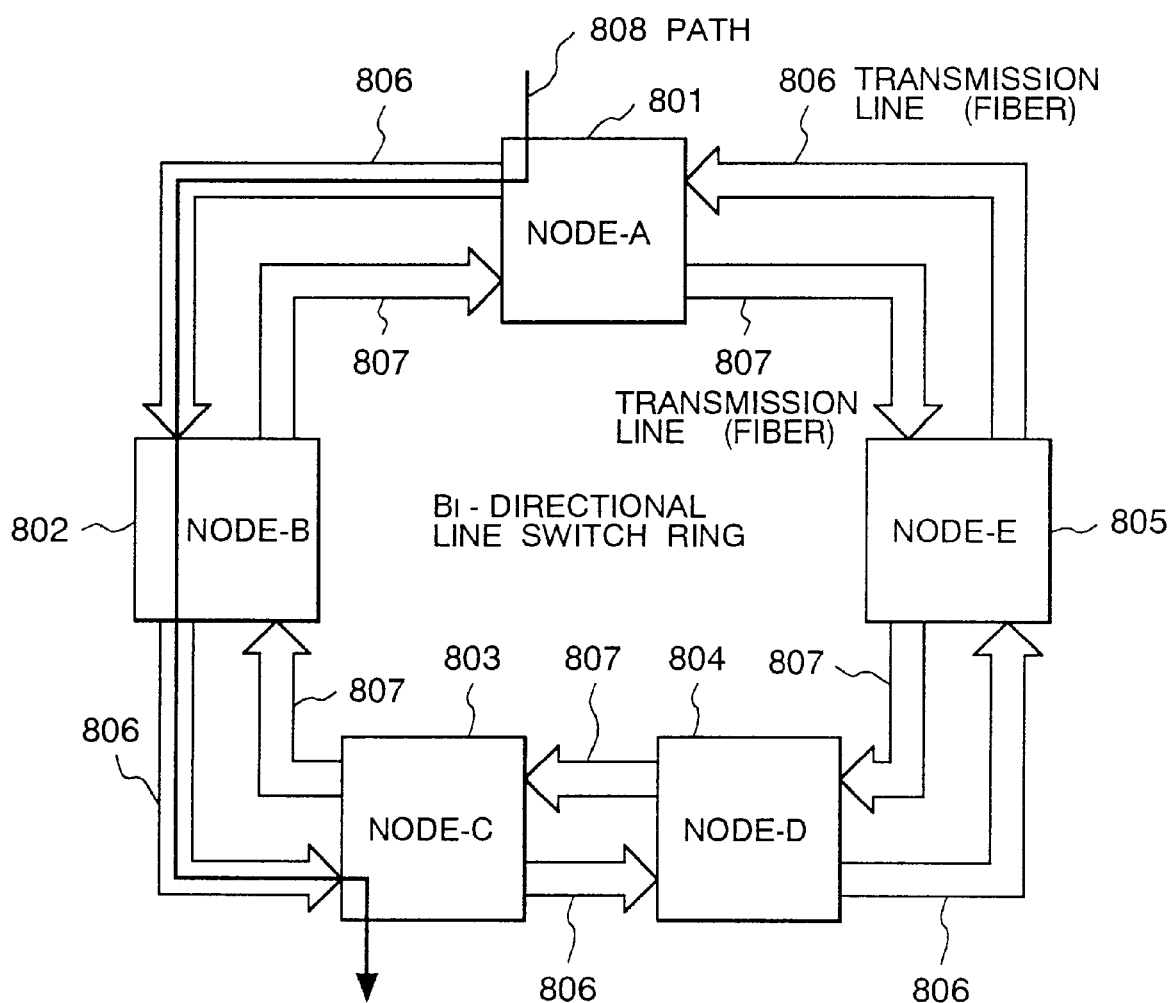
FIG. 1 is a configuration diagram showing a path route in a normal operation of an example of a BLSR.
Figure 2:
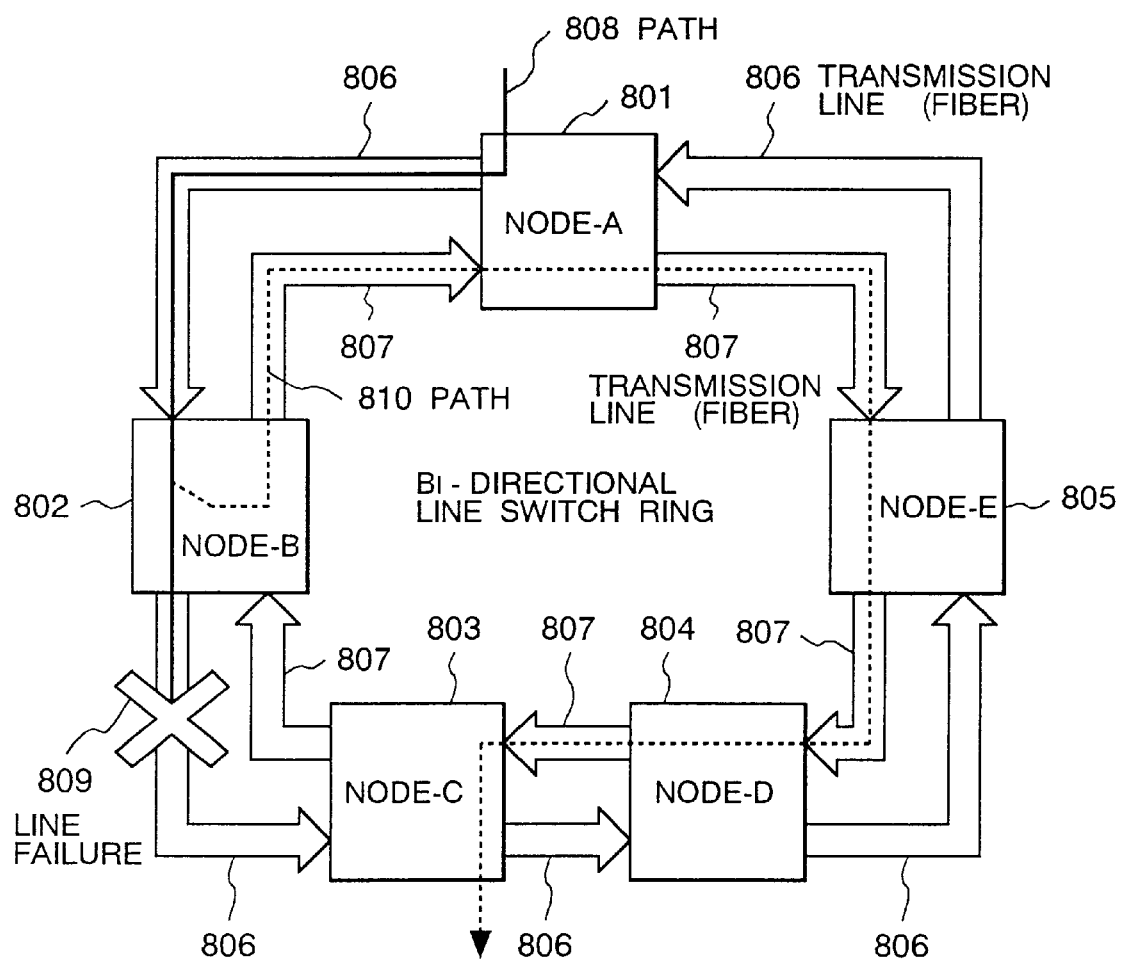
FIG. 2 is a configuration diagram showing a path route in the event of a failure occurring in the example of a BLSR shown in FIG. 1.
Figure 3:
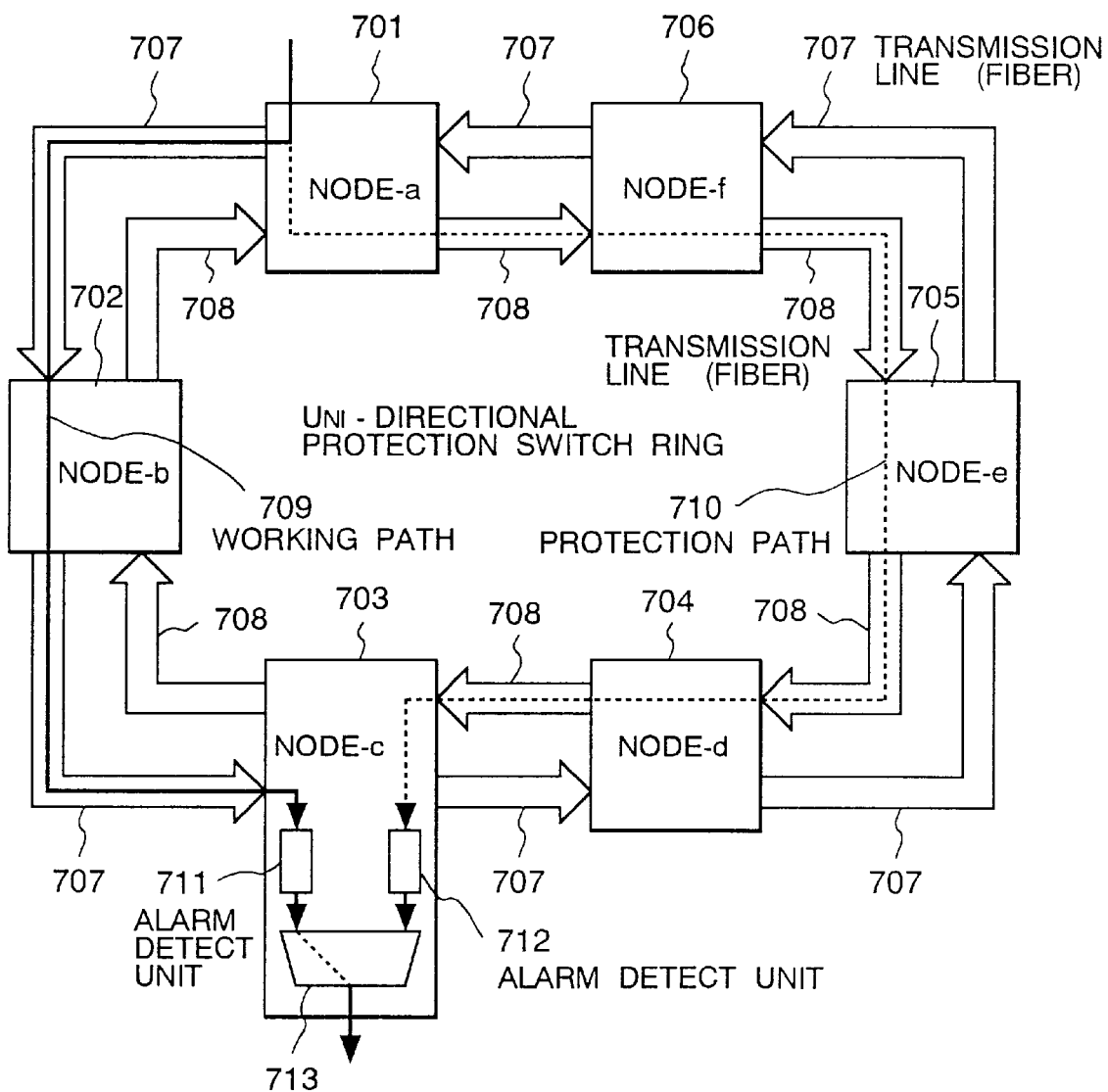
FIG. 3 is a configuration diagram showing an example of a UPSR.
Figure 4:
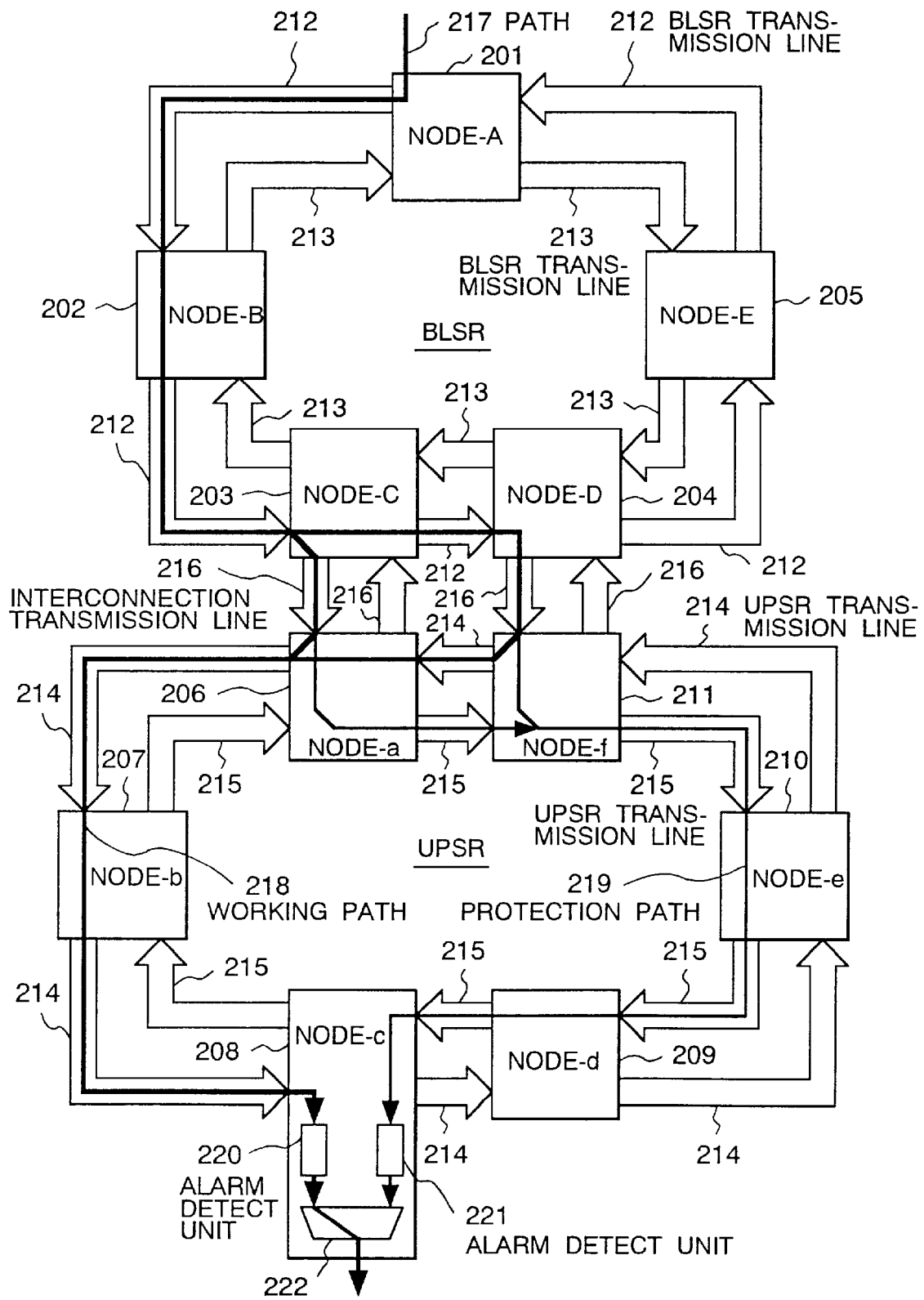
FIG. 4 is a configuration diagram showing path routes in a normal operation in a network system connecting a BLSR and a UPSR.
Figure 5:
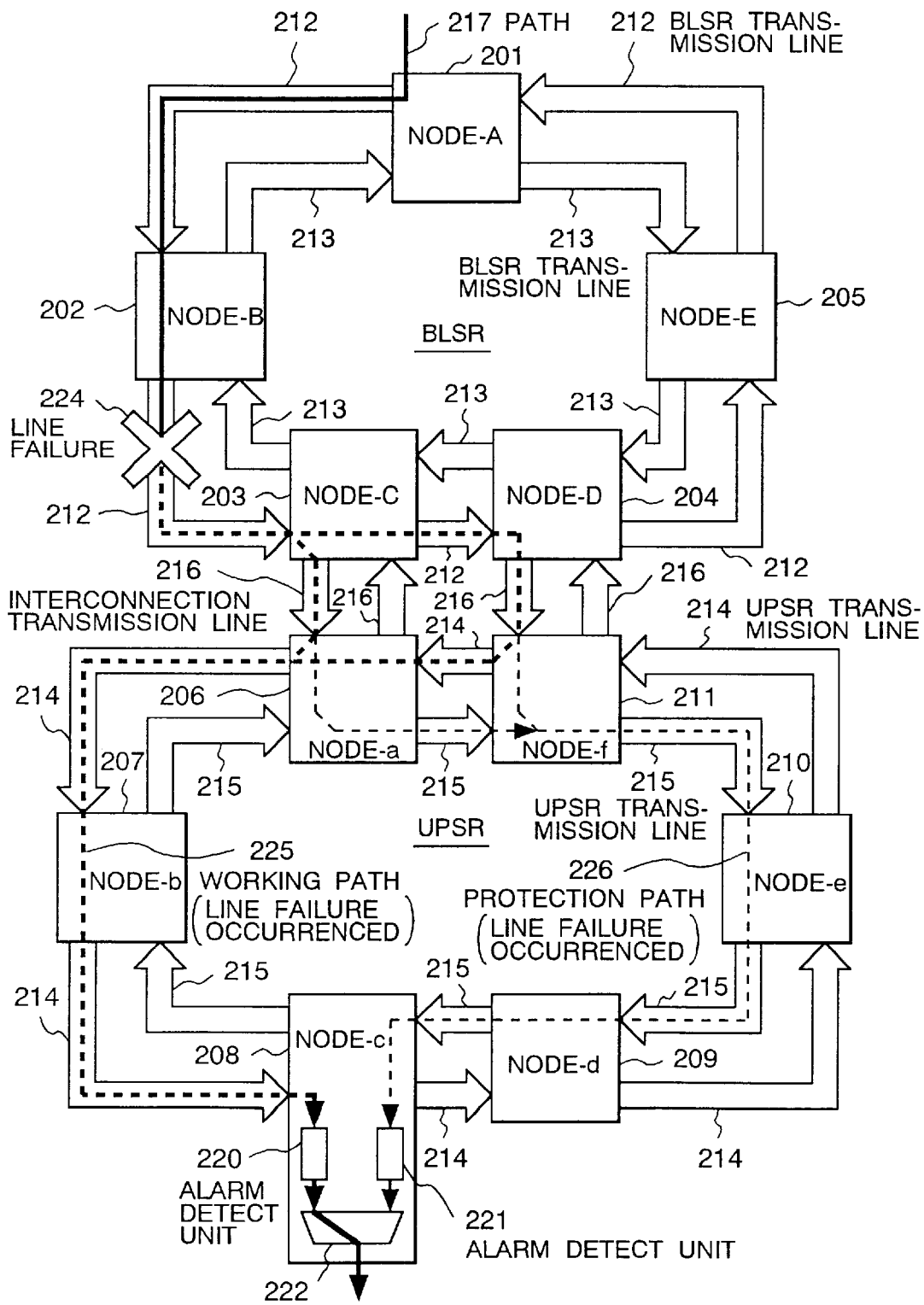
FIG. 5 is a configuration diagram showing path routes in the event of a failure occurring in the network system connecting a BLSR and a UPSR shown in FIG. 4.
Figure 6:
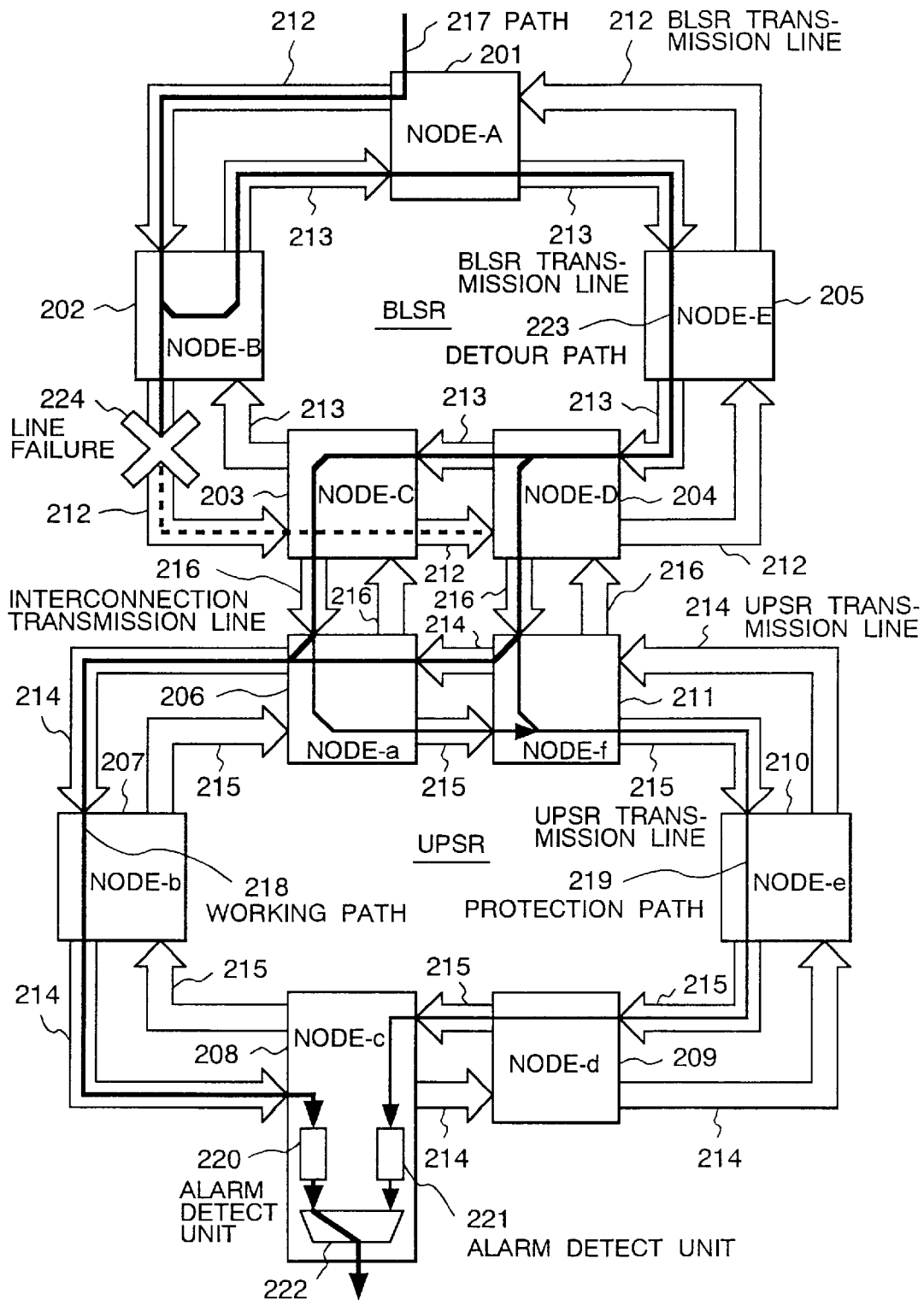
FIG. 6 is a configuration diagram showing path routes after a path switching operation has been carried out in the event of the failure occurring in the network system connecting a BLSR and a UPSR as shown in FIG. 5.
Figure 9:
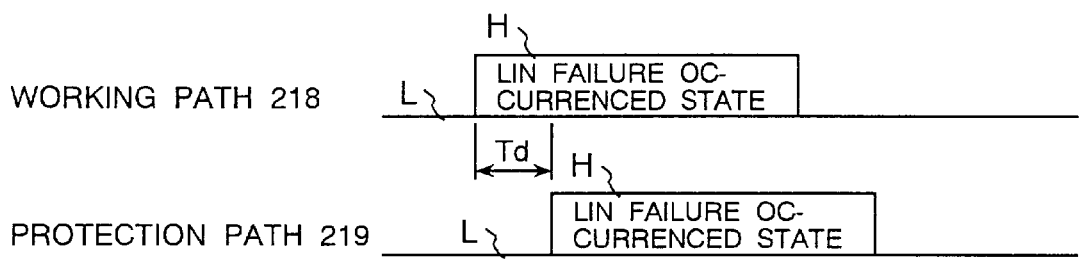
FIG. 9 is time charts showing a difference in arrival time of failure-alarm information at a path terminating node in the network system connecting a BLSR and a UPSR shown in FIG. 4.

The present invention will become more apparent from a study of the following detailed description of some preferred embodiments with reference to the accompanying diagrams. In particular, FIGS. 4 to 6 are configuration block diagrams used for explaining propagation of a failure occurring in a path switching operation of a BLSR of a network system connecting the BLSR and a UPSR to which the present invention is applied. In FIGS. 4 to 6, reference numerals 201 to 205 denote Node-A to Node-E respectively in the BLSR and reference numerals 206 to 211 are Node-a to Node-e respectively in the UPSR. Reference numerals 212 and 213 each denote a transmission line in the BLSR and reference numerals 214 and 215 are each a transmission line in the UPSR. Reference numeral 216 is a ring interconnect line for connecting the BLSR to the UPSR and reference numeral 217 denotes a transmission path in the BLSR. Reference numerals 218 and 219 are a working path and a protection path in the UPSR respectively. Reference numeral 220 and 221 denote alarm detect units employed at each node in the UPSR for the working and protection paths 218 and 219 respectively. Reference numeral 222 is a path select unit for selecting a path in accordance with alarm detection results output by the alarm detect units 220 and 221.

FIG. 4 is a diagram showing a path established from Node-A 201 in the BLSR to Node-c 208 in the UPSR. In the BLSR, the path starts from Node-A 201 and ends at Node-C 203 by way of Node-B 202. The path is continued from Node-C 203 in the BLSR to Node-a 206 in the UPSR and to Node-f 211 in the UPSR by way of Node-D 204 in the BLSR. In the UPSR, the continuing path starts from Node-a 206 and ends at Node-c 208 by way of Node-b 207, (serving as a working path). On the other hand, the path passing through Node-D 204 in the BLSR and Node-f 211 in the UPSR becomes a protection path which also ends at Node-c 208 by way of Node-e 210 and Node-d 209 in the UPSR.

Now, assume that a failure 224 occurs on a transmission line between Node-B 202 and Node-C 203 in the BLSR as shown in FIG. 5. At that time, the line failure 224 is detected at Node-C 203 and Node-D 204. As a result, the path to Node-C 203 and Node-D 204 is switched to a path from Node-E 205. A state of the network after the path switching is shown in FIG. 6.

In the BLSR, a time between the occurrence of the line failure 224 and the recovery of the path back to a normal state through completion of a path switching operation is prescribed to be within 50 ms in Bellcore's specifications. Thus, a time delay of up to 50 ms caused by a path failure affects the working and protection paths 218 and 219 in the UPSR. Since the route of the working path 218 is different from the route of the protection path 219, on the other hand, there is a difference in arrival time of failure-alarm information at Node-c 208 between the working and protection paths 218 and 219. The difference Td in arrival time of failure-alarm information at Node-c 208 between the working and protection paths 218 and 219 in the case of the example shown in FIG. 5 can be expressed as Td=2 (Te+Tt) where notation Te denotes a delay due to propagation through each node and notation Tf is a delay due to propagation between two consecutive nodes.

FIG. 7 is a block configuration diagram showing a path switching apparatus (employed in each UPSR node) as provided by an embodiment of the present invention. In the figure, reference numerals 101 and 102 each denote an input path whereas reference numeral 103 is a path selector for selecting either the input path 101 or the input path 102 (as an active path). Reference numerals 104 and 105 are alarm detect circuits for the input paths 101 and 102 respectively. Reference 106 is a guard timer for delaying alarm information generated by the alarm detect circuit 104 by a predetermined time and reference 107 is a guard timer for delaying alarm information generated by the alarm detect circuit 105 by a predetermined time.

Reference numeral 108 is an alarm management circuit for processing the alarm information output by the alarm detect circuit 104 and delayed alarm information output by the guard timer 106. To put in detail, when the input path 101 is serving as an active path, the alarm management circuit 108 computes the logical product of the alarm information and the delayed alarm information. When the input path 101 is serving as a standby path, on the other hand, the alarm management circuit 108 computes the logical sum of the alarm information and the delayed alarm information. By the same token, reference numeral 109 is an alarm management circuit for processing the alarm information output by the alarm detect circuit 105 and delayed alarm information output by the guard timer 107. To put in detail, when the input path 102 is serving as an active path, the alarm management circuit 109 computes the logical product of the alarm information and the delayed alarm information. When the input path 102 is serving as a standby path, on the other hand, the alarm management circuit 109 computes the logical sum of the alarm information and the delayed alarm information.

Reference numeral 110 is a switch control circuit for outputting a control signal to the path selector 103 to select either the input path 101 or 102 as a normal (active) path on the basis of the pieces of alarm information of the input paths 101 and 102 received from the alarm management circuits 108 and 109 respectively. The switch control circuit 110 also notifies the alarm management circuit 108 of the selection status of the input path 101, that is, whether the input path 101 is serving as an active or standby path. By the same token, the switch control circuit 110 also notifies the alarm management circuit 109 of the selection status of the input path 102, that is, whether the input path 102 is serving as an active or standby path. FIG. 8 is a table showing switching logic embraced by the switch control circuit 110 employed in the path switching apparatus shown in FIG. 7.

Figure 13:
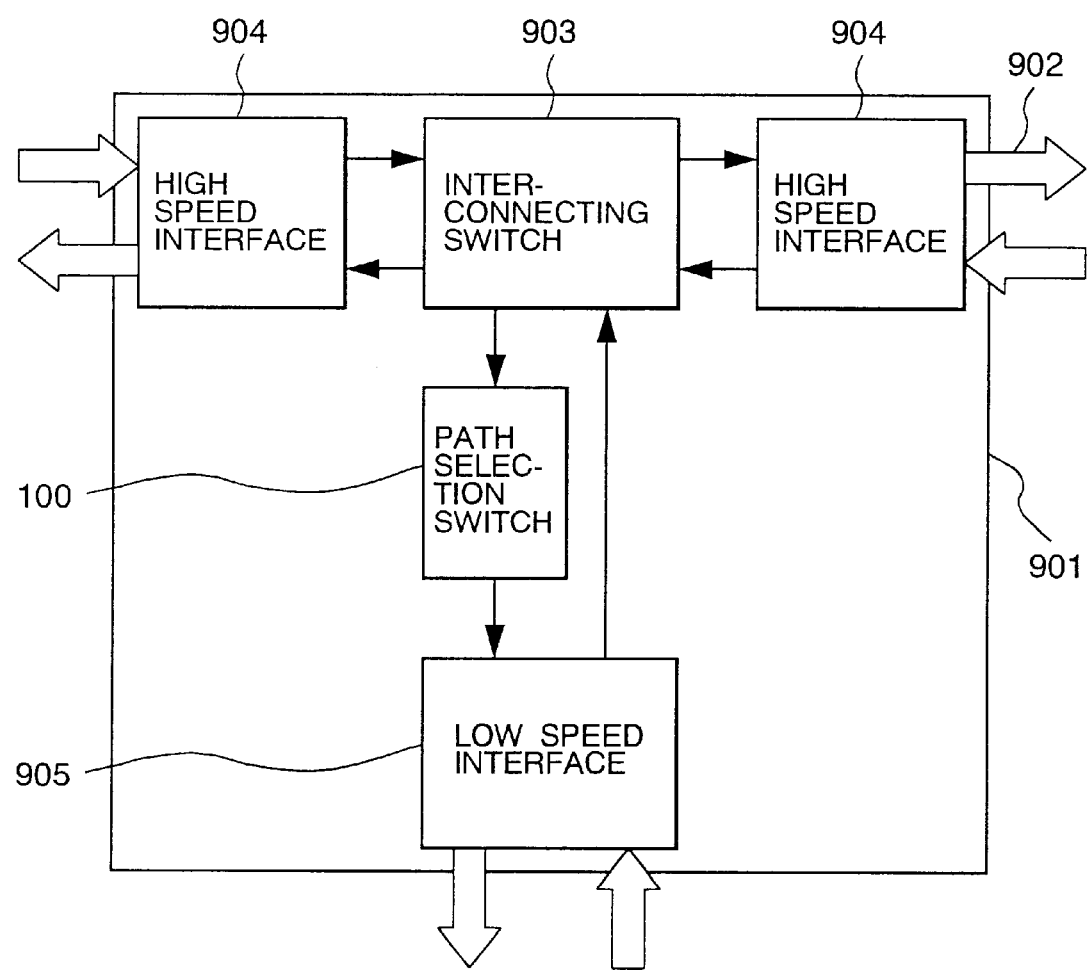
FIG. 13 is a diagram used for explaining the configuration of a typical node in a UPSR system.

FIG. 13 is a diagram used for explaining the configuration of a typical node provided by the present invention. As shown in the figure, the node comprises two high-speed interface units 904, an interconnecting switch 903, a low-speed interface unit 905 and a path selection switch 100, (that is, the path switching apparatus shown in FIG. 7). Sandwiched by the high-speed interface units 904, the interconnecting switch 903 is used for switching signals exchanged between the high-speed interface units 904, a drop signal transmitted from the high-speed interface units 904 to the low-speed interface unit 905 and an add signal transmitted from the low-speed interface signal 905 to the high-speed interface unit 904. Inserted on the path of the drop signal, the path selection signal 100 selects one of the two input paths, carrying out path switching based on the switching logic shown in FIG. 8.

Path switching operations which are carried out in the event of a line failure occurring in a network system as has been described with reference to FIGS. 4 to 6 are explained by referring to the path switching apparatus shown in FIG. 7, the switching logic shown in FIG. 8 and the node shown in FIG. 13.

First of all, individual operations carried out by the path switching apparatus are explained. Assume that an alarm indicating a line-failure-occurrence state with a difference Td in arrival time of failure-alarm information between the working and protection paths 218 and 219 like one shown in FIG. 7 is input through the input paths 102 and 1032. A failure propagated through the input path 101 is detected as an alarm by the alarm detect circuit 104 and output as alarm information to the alarm management circuit 108 and the guard timer 106. In the guard timer 106, the alarm information supplied thereto is delayed by a predetermined time Tt before being output to the alarm management circuit 108. The time Tt is set at a value equal to or longer than a maximum propagation delay time Tdmax which is determined from the number of nodes and differences in propagation delay time between nodes in the UPSR system. In the alarm management circuit 108, different kinds of processing depending on the selection status of the input path 101, that is, depending whether the input path 101 is serving as an active or standby path are carried out on pieces of alarm information supplied from the alarm detect circuit 104 and the guard timer 106 and a result of the processing is output to the switch control circuit 110.

Figure 10:
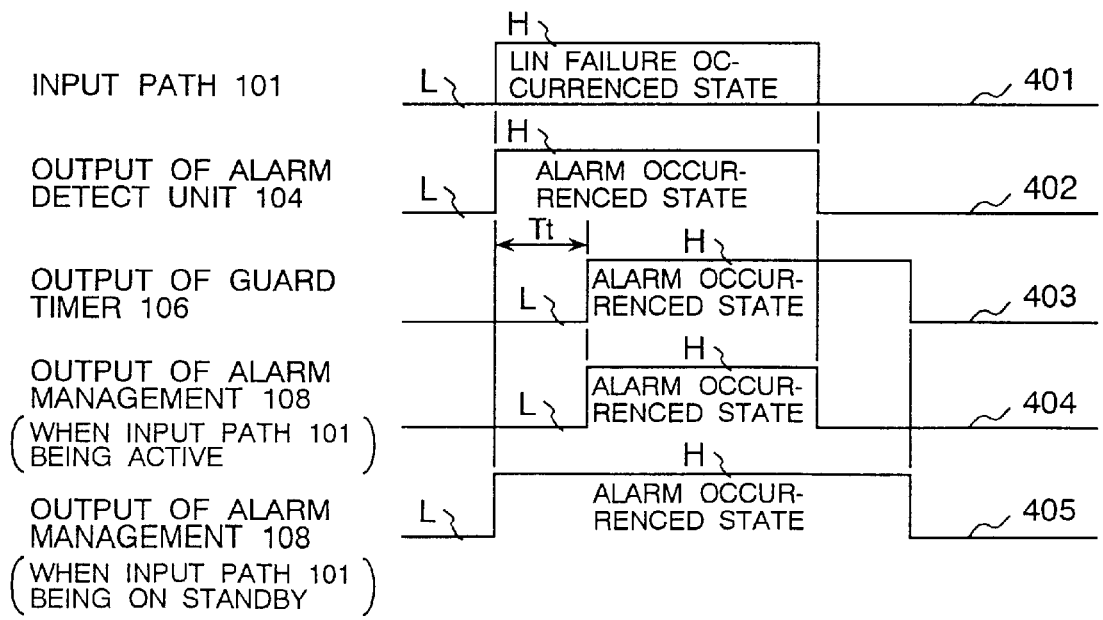
FIG. 10 is time charts showing path switching operations of an alarm management circuit employed in the path switching apparatus shown in FIG. 7.

Outputs in the path switching apparatus 108 are shown in FIG. 10. In the figure, reference numeral 401 denotes a line-failure-occurrence state of the input path 101 and reference numeral 402 is the output of the alarm detect circuit 104. Reference numeral 403 denotes the output of the guard timer 106 and reference numeral 404 is the output of the alarm management circuit 108 with the input path 101 serving as an active path. Reference numeral 405 is the output of the alarm management circuit 108 with the input path 101 serving as a standby path. When the input path 101 is serving as an active path, the alarm management circuit 108 computes the logical product of the alarm information 402 generated by the alarm detect circuit 104 and the delayed alarm information 403 generated by the guard timer 106, outputting the logical product as the output 404. When the input path 101 is serving as a standby path, on the other hand, the alarm management circuit 108 computes the logical sum of the alarm information 402 generated by the alarm detect circuit 104 and the delayed alarm information 403 generated by the guard timer 106, outputting the logical product as the output 405. In the case being explained, since the input path 101 is serving as an active path, the signal 404 shown in FIG. 10 is supplied to the switch control circuit 110.

For the input path 102, on the other hand, the same processing as that for the input path 101 is carried out. That is to say, a failure propagated through the input path 102 is detected as an alarm by the alarm detect circuit 105 and output as alarm information to the alarm management circuit 109 and the guard timer 107. In the guard timer 107, the alarm information supplied thereto is delayed by the predetermined time Tt before being output to the alarm management circuit 109.

Since the input path 102 is serving as a standby path, the alarm management circuit 109 computes the logical sum of the alarm information generated by the alarm detect circuit 105 and the delayed alarm information generated by the guard timer 107, outputting the logical product corresponding to the output 405 shown in FIG. 10 to the switch control circuit 110. Receiving the signals output by the alarm management circuits 108 and 109, the switch control circuit 110 outputs a switch control signal to the path selector 103 in accordance with the select logic shown in FIG. 8, that is, logic for always selecting the normal path. In addition, the selection status of the input paths is supplied to the alarm management circuits 108 and 109.

Figure 11:
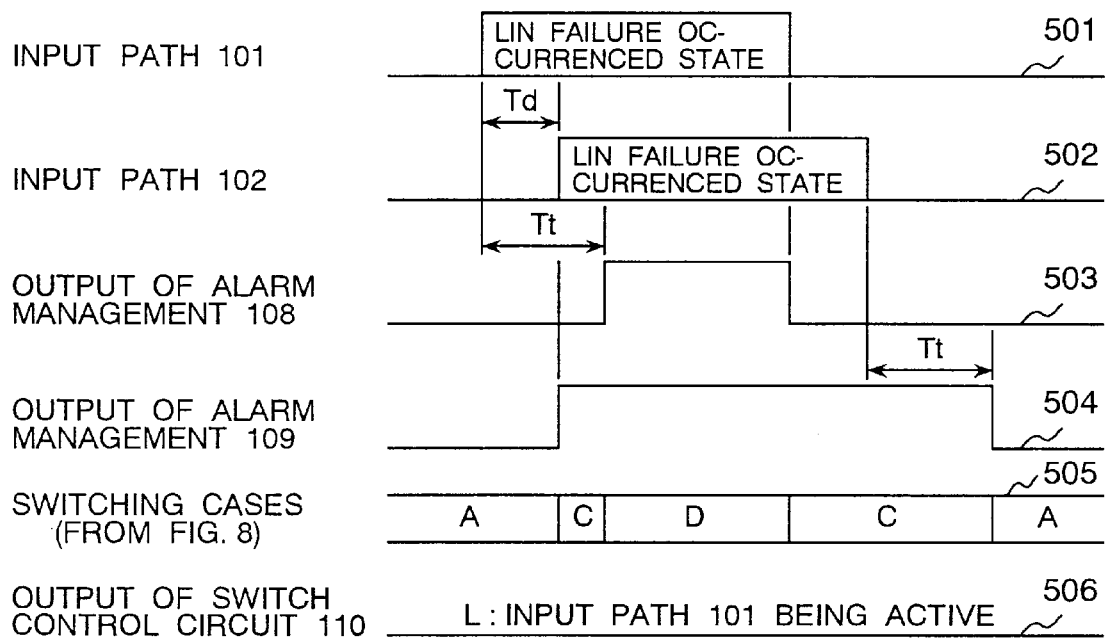
FIG. 11 is time charts showing a path switching operation in the event of a failure arriving earlier at an input bus 101 of the path switching apparatus shown in FIG. 7.
Figure 12:
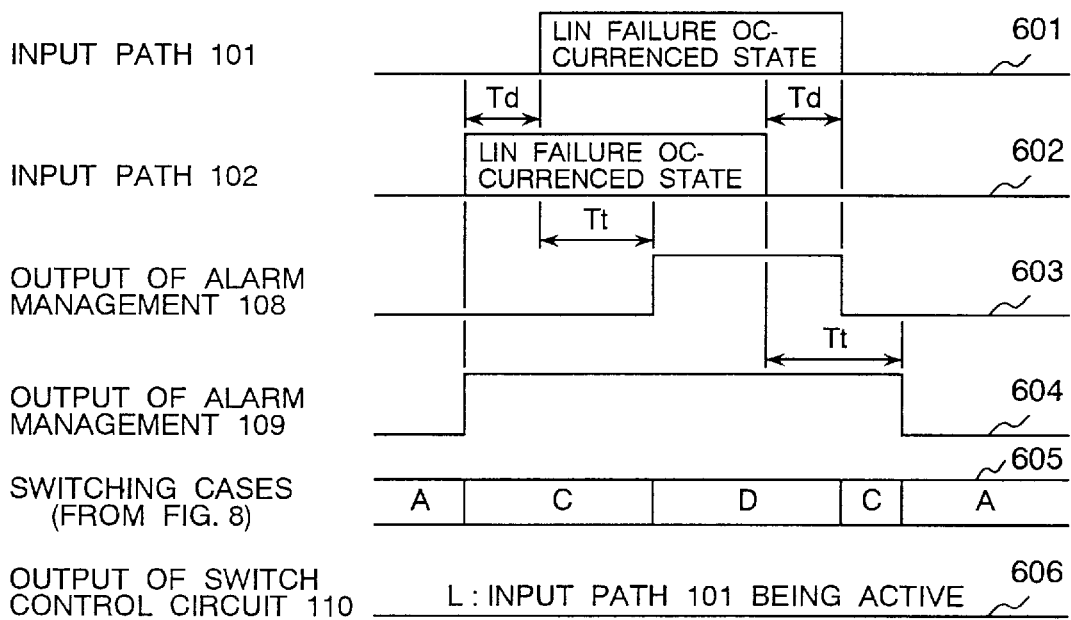
FIG. 12 is time charts showing a path switching operation in the event of a failure arriving earlier at an input bus 102 of the path switching apparatus shown in FIG. 7.

The operation of the switch control circuit 110 is explained for each case as follows by referring to FIGS. 11 and 12 respectively.

First of all, consider a case in which, with the input path 101 selected as an active path, a failure on the input path 101 arrives earlier than that on the input path 102 by the time Td. This case is explained by referring to FIG. 11. In the path switching apparatus shown in FIG. 7, the failure 501 on the input path 101 causes alarm information detected by the alarm detect circuit 104 and alarm information delayed by the guard timer 106 by the time Tt to be supplied to the alarm management circuit 108. Since the input path 101 is serving as an active path, the alarm management circuit 108 produces the logical product 503 of the alarm information supplied by the alarm detect circuit 104 and the delayed alarm information supplied by the guard timer 106 as shown in FIG. 11. On the other hand, a failure 502 on the input path 102 lags behind the failure 501 on the input path 101. Much like the input path 101, in the path switching apparatus shown in FIG. 7, the failure 502 on the input path 102 causes alarm information detected by the alarm detect circuit 105 and alarm information delayed by the guard timer 107 by the time Tt to be supplied to the alarm management circuit 109. Since the input path 102 is serving as a standby path, on the other hand, the alarm management circuit 109 produces the logical sum 504 of the alarm information supplied by the alarm detect circuit 105 and the delayed alarm information supplied by the guard timer 107 as shown in FIG. 11. Receiving the logical product 503 and the logical sum 504 from the alarm management circuits 108 and 109 respectively, the switch control circuit 110 outputs a switch control signal 506 shown in FIG. 11 for controlling the path selector 103 in accordance with the select logic shown in FIG. 8. It is obvious from FIG. 8 that, with the input path 101 serving as an active path, switching will take place only if the input path 102 does function normally and a failure does occur on the input path 101. From the logical product 503 and the logical sum 504 shown in FIG. 11, the present case does not match a condition for path switching to take place as shown in FIG. 8, causing no switching to occur in the event of the failure. In addition, since Tt is set at a value equal to or longer than the maximum value Tdmax of Td, in the present case, no switching takes place.

Next, consider a case in which, with the input path 101 selected as an active path, a failure on the input path 101 arrives later than that on the input path 102 by the time Td. This case is explained by referring to FIG. 12. In the path switching apparatus shown in FIG. 7, the failure 601 on the input path 101 causes alarm information detected by the alarm detect circuit 104 and alarm information delayed by the guard timer 106 by the time Tt to be supplied to the alarm management circuit 108. Since the input path 101 is serving as an active path, the alarm management circuit 108 produces the logical product 603 of the alarm information supplied by the alarm detect circuit 104 and the delayed alarm information supplied by the guard timer 106 as shown in FIG. 12. On the other hand, a failure 602 on the input path 602 leads ahead of the failure 601 on the input path 101. Much like the input path 101, in the path switching apparatus shown in FIG. 7, the failure 602 on the input path 102 causes alarm information detected by the alarm detect circuit 105 and alarm information delayed by the guard timer 107 by the time Tt to be supplied to the alarm management circuit 109. Since the input path 102 is serving as a standby path, on the other hand, the alarm management circuit 109 produces the logical sum 604 of the alarm information supplied by the alarm detect circuit 105 and the delayed alarm information supplied by the guard timer 107 as shown in FIG. 12. Receiving the logical product 603 and the logical sum 604 from the alarm management circuits 108 and 109 respectively, the switch control circuit 110 outputs a switch control signal 606 shown in FIG. 12 for controlling the path selector 103 in accordance with the select logic shown in FIG. 8. From the logical product 603 and the logical sum 604 shown in FIG. 12, much like the case described above, the present case does not match a condition for path switching to take place as shown in FIG. 8, causing no switching to occur in the event of the failure.

As described above, the present invention exhibits an effect that, in a network system with a BLSR connected to a UPSR, in the event of simultaneous failures occurring at the same time on both the working and protection paths of the UPSR due to path switching in the BLSR, it is possible to prevent an erroneous switching operation from occurring in a phenomenon that would not cause path switching to take place in a stand-alone UPSR, making complex software processing unnecessary.

What is claimed is:

1. A method for switching from a working path to a protection path or vice versa in a UPSR of a compound network connecting said UPSR to another ring network through an interconnection node, said method comprising the steps of:

detecting a failure occurring on said working path and a failure occurring on said protection path independently of each other as failure information;

detecting failure information of an active path;

detecting failure information of a standby path;

receiving the first arrived one of the detected failure information, at a node in said UPSR;

waiting from the received time of said first arrived one, for a predetermined time longer than the maximum possible time difference between the arrival of the detected failure information through said active path and through said standby path; and selecting either said working or protection path as an active path.

2. A method for switching from a working path to a protection path or vice versa in a UPSR of a compound network connecting said UPSR to another ring network through an interconnection node, said method comprising the steps of:

detecting a failure occurring on said working path and a failure occurring on said protection path independently of each other as failure information;

detecting failure information of an active path;

detecting failure information of a standby path;

delaying a failure detection time for said failure information of said active path by a first predetermined time;

delaying a failure recovery time for said failure information of said standby path by a second predetermined time; and selecting either said working or protection path as an active path by comparing said failure information of said active path delayed by said first predetermined time with said failure information of said standby path delayed by said second predetermined time.

3. A path switching apparatus for switching from a working path to a protection path or vice versa in a UPSR of a compound network connecting said UPSR to another ring network through an interconnection node, said apparatus comprising:

a failure-information detect circuit for detecting a failure occurring on said working path and a failure occurring on said protection path independently of each other as failure information;

a failure-information-path identifying circuit for determining whether a working path with a failure occurring thereon is an active or standby path or for determining whether a protection path with a failure occurring thereon is an active or standby path; and a select circuit for selecting either said working or protection path as an active path in accordance with results of detection and determination by said failure-information detect circuit and said failure-information-path identifying circuit respectively.

4. A path switching apparatus for switching from a working path to a protection path or vice versa in a UPSR of a compound network connecting said UPSR to another ring network through an interconnection node, said apparatus comprising:

a first failure-information detect circuit for detecting a failure occurring on said working path;

a second failure-information detect circuit for detecting a failure occurring on said protection path;

a first guard circuit for delaying a failure detection time for failure information of said working or protection path selected as an active path by a first predetermined time;

a second guard circuit for delaying a failure recovery time for failure information of said working or protection path selected as a standby path by a second predetermined time; and a select circuit for selecting either said working or protection path as an active path in accordance with delayed failure information output by said first guard circuit and delayed failure information output by said second guard circuit.

5. A path switching apparatus employed in a node of a UPSR comprising:

a path selector for selecting either a first input path or a second input path;

a first alarm detect circuit for detecting an alarm on said first input path;

a first timer for inputting an output of said first alarm detect circuit;

a first management circuit for outputting a first protected alarm based on inputs comprising said output of said first alarm detect circuit, an output of said first timer and select information for said path selector;

a second alarm detect circuit for detecting an alarm on said second input path;

a second timer for inputting an output of said second alarm detect circuit;

a second management circuit for outputting a second protected alarm based on inputs comprising said output of said second alarm detect circuit, an output of said second timer and select information for said path selector; and a switch control circuit for controlling a path switching operation of said path selector in accordance with inputs comprising said first and second protected alarms.

* * * * *